United States Patent [19]

Fralish

[11] 4,437,529

[45] Mar. 20, 1984

[54] DETACHABLE HINGE ASSEMBLY

[75] Inventor: Mark R. Fralish, Berlin, Wis.

[73] Assignee: Ingersoll Equipment Co., Inc., Winneconne, Wis.

[21] Appl. No.: 373,870

[22] Filed: May 3, 1982

[51] Int. Cl.³ .............................................. B62D 25/10
[52] U.S. Cl. ................................ 180/69 C; 180/89.17; 16/268; 16/374; 16/378; 220/340
[58] Field of Search ................ 180/69 C, 69 R, 89.17, 180/89.14; 49/261, 397; 16/268, 261, 262, 374, 378, 386; 220/340, 338, 334

[56] References Cited

U.S. PATENT DOCUMENTS

| 1,154,920 | 9/1915 | Greenfield | 16/261 |
| 1,598,868 | 9/1926 | Lundelius | 180/69.21 |
| 2,722,034 | 11/1955 | May | 16/268 |
| 3,815,701 | 6/1974 | Mayhew | 16/268 |

FOREIGN PATENT DOCUMENTS 502467 11/1927 Fed. Rep. of Germany ........ 49/261

Primary Examiner—Joseph F. Peters, Jr.
Assistant Examiner—Joseph McCarthy
Attorney, Agent, or Firm—Dressler, Goldsmith, Shore, Sutker & Milnamow, Ltd.

[57] ABSTRACT

A detachable hinge assembly consisting of a generally L-shaped member secured to a movable structure and a second generally z-shaped member secured to a frame, the L-shaped member having openings in each of its leg portions through which leg portions the Z-shaped members extend. The relationship between the openings and leg portions is designed so that the upward and sideward member of the L-shaped member relative to the z-shaped member is restricted, while permitting the L-shaped member to be pivoted relative to the z-shaped member, so that the movable structure to which the L-shaped member is attached can be disengaged from the z-shaped member without the use of tools.

8 Claims, 5 Drawing Figures

DETACHABLE HINGE ASSEMBLY

This invention relates to a detachable hinge assembly, and, or more particularly, to a two-piece detachable hinge for use with the hood of a tractor, or the like.

More particularly, it provides a simplified hinge arrangement that will provide for positive location of the hood of the tractor in all directions of movement of the hood relative to the tractor, yet will permit maximum opening of the hood relative to the tractor and retention of the hood in the elevated position. The hinge is particularly novel in that it provides the multiple function of hinging the hood relative to the tractor, provides for maximum opening of the tractor hood, yet permitting removal of the hood from the tractor without the use of tools.

In accordance with the present invention, there is provided a novel, two-piece hinge assembly that can be made of a simple sheet metal construction which provides all the desirable functions of a hinge for a tractor hood relative to a tractor body. It is, of course, to be understood that this is but one application of the novel hinge assembly and it can be used wherever it is desirable to hinge one member relative to another while providing for positive location of the two members relative to each other, yet permitting removal of the two members relative to each other when desired without the use of tools. In addition, as aforementioned, while providing the desirable hinge relationship, it provides the additional feature of maintaining the hood member in the open position when in the hinged condition.

In the instant application, one of the hinge members is secured to the hood, and the other hinge member is affixed to the frame of the tractor. The hinge assembly consists of a plurality of interlocking legs and openings which restrict the movement of the hood in all directions relative to the frame of the tractor until it is desired to hinge the hood relative to the tractor body. When this is desired, the hinge permits the hood to be moved relative to the main tractor frame in such a manner that the hinge assembly will permit pivotal movement into a position where the hood assembly is supported on the hinge member secured to the tractor to permit working within the engine compartment of the tractor when desired. It merely takes slight additional movement to remove the hood from the tractor, which, of course, can be done without the use of tools.

The above-mentioned and other advantages of the present invention will be further understood from the following drawings in which there is an embodiment of the hinge assembly disclosed in detail:

Figure 1:
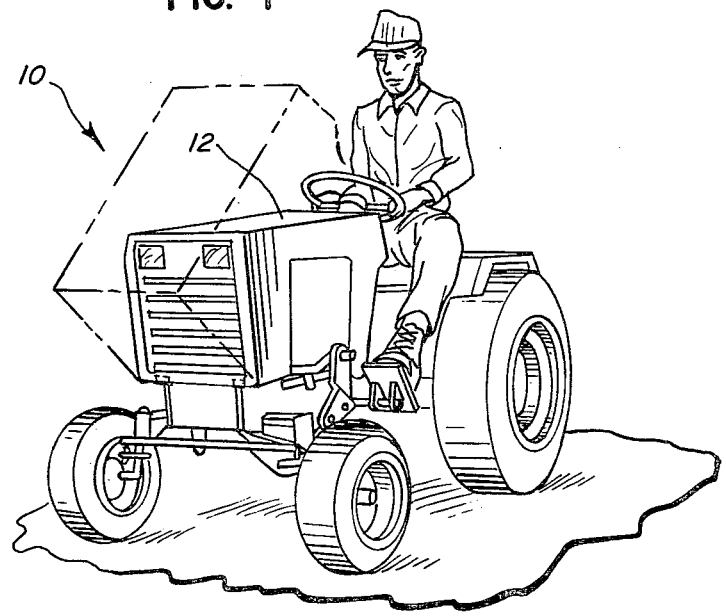
FIG. 1 is a perspective view showing a tractor with the hood mounted in the normally closed position (solid lines) and open position (dotted lines)

Referring first to FIG. 1, there is shown the tractor 10 with the hood 12 being shown in solid lines in the normal position and in dotted lines in the elevated position which is permitted by the novel hinge assembly hereinafter described.

Figure 2:
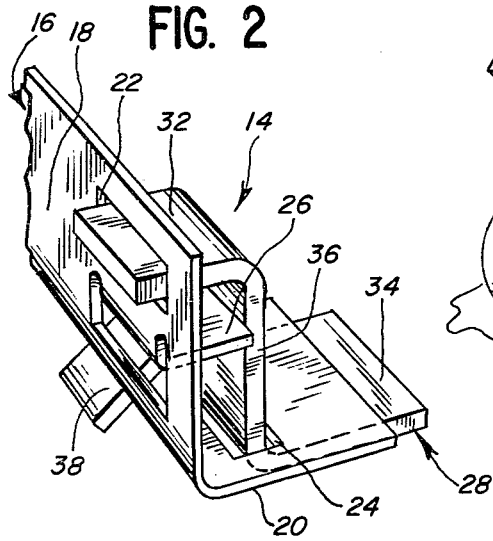
FIG. 2 is a perspective view of the hinge assembly.
Figure 3:
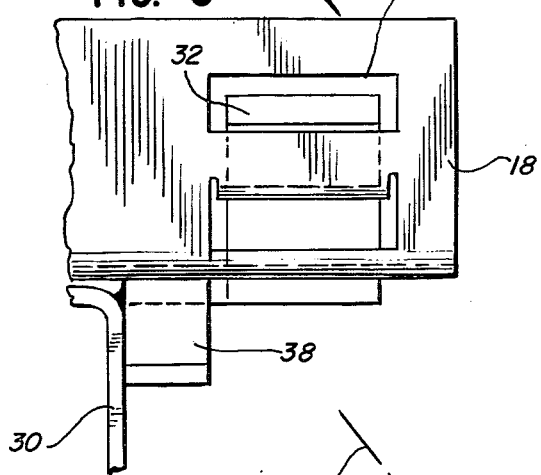
FIG. 3 is a front elevation view of the hinge assembly.
Figure 4:
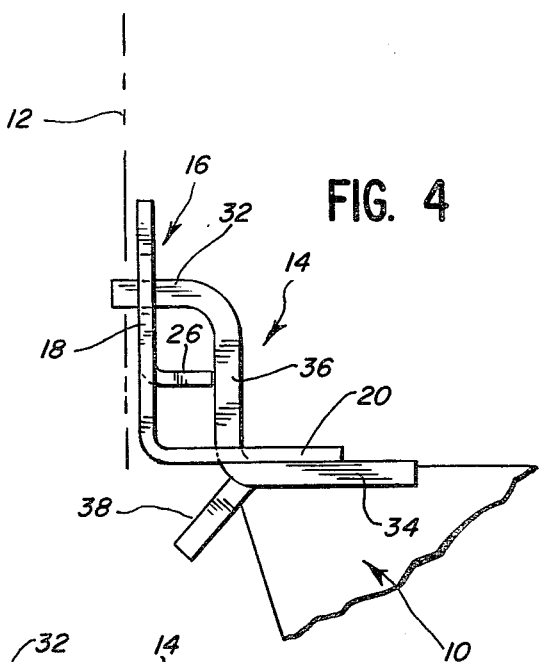
FIG. 4 is a side elevation view of the hinge assembly.

Referring now specifically to FIG. 2, there is shown the perspective view of applicant's novel hinge assembly 14. This assembly consists of two relatively movable members consisting of a first L-shaped member 16 which is welded to the hood. The member 16 consists of an upwardly extending leg 18 and a horizontally extending leg 20. Defined by the upward extending leg 18 is an opening 22 which is adapted to receive a leg portion of the hinge member 28. Provided in the lower horizontal leg 20 of the L-shaped member 16 is an opening 24 which is also designed to receive a leg portion of the second hinged Z-shaped member 28. For reasons to be described hereinafter, leg 18 provides a flange member 26 which has been formed out of the wall 18 of the L-shaped hinge member 16. As previously mentioned, since the hinge member 16 is welded to the hood 12, movement of the hood carries along with it this member.

The second portion of the hinge assembly 14 consists of the generally Z-shaped member 28 which is welded to the frame 30 on the tractor 10. This Z-shaped member consists of an upward horizontal leg 32, a lower horizontal leg 34, and an intermediate vertically extending leg 36. In the hinged (normally closed) condition, the leg 32 extends through the opening 22 in the leg 18 of the L-shaped hinge member 16 and the vertical leg 36 extends through the opening 24 in the leg 20 of the L-shaped member 16.

The relationship between the opening 22 and the leg 32 and the leg 36 and the opening 24 is defined so that the movement of the hood is obviously restricted in the sidewise direction, since it would contact the edges of the openings 22 and 24 when the hood was moved in the side-to-side direction. The upward movement of the hood relative to the frame would be limited by contact between the leg 32 and the lower wall of the opening 22.

The flange 26 formed out of the wall 18 of the L-shaped member 16 is designed to abut the vertically extending section 36 of the z-shaped member 28 and thus the rearward movement of the hood relative to the frame is limited by this contact.

The backward edge of the opening 24 in the leg section 20 limits the forward movement of the hood relative to the frame by contacting the vertically extending section 36 of the Z-shaped member 28.

Figure 5:
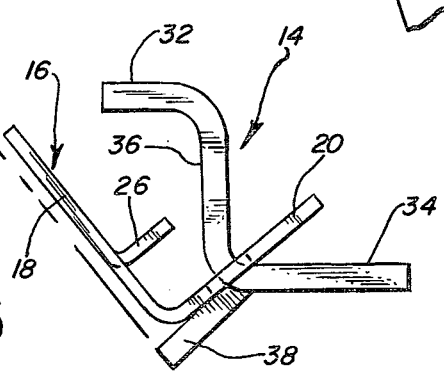
FIG. 5 shows the hood being moved to the elevated position and retained in place on a stop member provided by the hinge assembly.

The backward edge of the opening 24 in the leg section 20 serves as a pivot when it is desired to move the hood to the position shown by dotted lines in FIG. 1. This position is shown in FIG. 5 and it results in the leg member 18 being moved out of engagement with the horizontally extending leg 32. At this time, the hood can be lowered to where the bottom leg portion 20 will rest on the stop member 38, which forms a part of the Z-shaped member 28. It can be appreciated that in this position, the hood is retained in the elevated angle and that if it is desired to remove the hood from the tractor, this can be done without requiring any tools. The hood can be merely moved up along the leg 36 and outwardly of the leg 32 to provide for total disengagement of the hood relative to the tractor.

While one embodiment has been shown, it can be appreciated that changes can be made within the scope within the following claims if so desired.

What is claimed is:

1. A detachable hinge assembly comprising a first, generally L-shaped member secured to a movable structure, a second member secured to a frame, said first member defining openings in each of its leg portions, said second member having leg portions extending through the openings in said first member, the relationships between said leg portions and at least one of said openings being designed so that the upward and sideward movement of the first member relative to said second member is restricted and the first member can be pivoted relative to said second member so that the movable structure can be disengaged from said second member without the use of tools.

2. A detachable hinge assembly as set forth in claim 1 in which one of said members defines a flange portion to limit the rearward movement of said first member relative to said second member.

3. A detachable hinge assembly as set forth in claim 2 in which said first member defines the flange portion adjacent the opening receiving the leg portion to limit the upward movement of the first member relative to the second member.

4. A detachable hinge assembly as set forth in claim 1 in which the second member defines a downwardly extending stop member that supports the first member and movable structure in a downwardly directed position relative to said second member.

5. A detachable hinge assembly for mounting a hood relative to the frame of a tractor comprising a first, generally L-shaped member secured to the hood, a second, generally Z-shaped member secured to the frame of the tractor, said L-shaped member defining an opening in its vertical leg portion and a second opening in its horizontally extending leg portion, said Z-shaped member comprising a first leg extending into the opening of said upwardly extending leg portion of the first member and a second leg disposed through the opening in said second leg portion of the first member, the openings in said L-shaped member and the corresponding leg portions in said Z-shaped member being defined so that the movement of the hood is restricted in the upper and sidewise directions relative to the frame member of the tractor.

6. A hinge assembly as set forth in claim 5 in which the vertically extending leg portion of said L-shaped member defines a flange member adapted to engage the vertical leg portion of said Z-shaped leg member to prevent movement of the hood in a rearward direction relative to said tractor.

7. A detachable hinge assembly as set forth in claim 5 in which said Z-shaped member defines a stop portion comprising a downwardly inclined leg portion whereby when the hood and associated L-shaped member is pivoted relative to said Z-shaped member it will be retained in the downwardly inclined position by said stop member.

8. A detachable hinge assembly as set forth in claim 5 in which forward movement of the hood relative to the tractor is retained by the rearward edge of the opening in the horizontal leg of the first member against the upwardly extending leg portion of the second member, this relationship of the opening in the horizontal leg of the first member to the upwardly extending leg portion of the second member also functioning as the pivotal means of the detachable hinge assembly.

* * * * *